INVENTOR.
DAVID WADE RHYS
BY
M. L. Pinel
ATTORNEY

United States Patent Office 3,466,158
Patented Sept. 9, 1969

3,466,158
COMPOUND PRECIOUS METAL ARTICLE
HAVING LAYER CONTAINING IRIDIUM
OR RUTHENIUM
David Wade Rhys, Gerrards Cross, England, assignor to
The International Nickel Company, Inc., New York,
N.Y., a corporation of Delaware
Filed Jan. 4, 1967, Ser. No. 607,197
Claims priority, application Great Britain, Jan. 10, 1966,
1,108/66; Sept. 20, 1966, 41,874/66
Int. Cl. C01g 55/00
U.S. Cl. 29—199                                6 Claims

ABSTRACT OF THE DISCLOSURE

Bonded compound article, e.g., spark plug, comprising a silver component and a high melting point component of iridium, ruthenium or an iridium-rich or ruthenium-rich alloy connected by a junction made of a silver-palladium alloy; metallurgical process comprising brazing and welding precious metals.

---

Figures 1, 2:
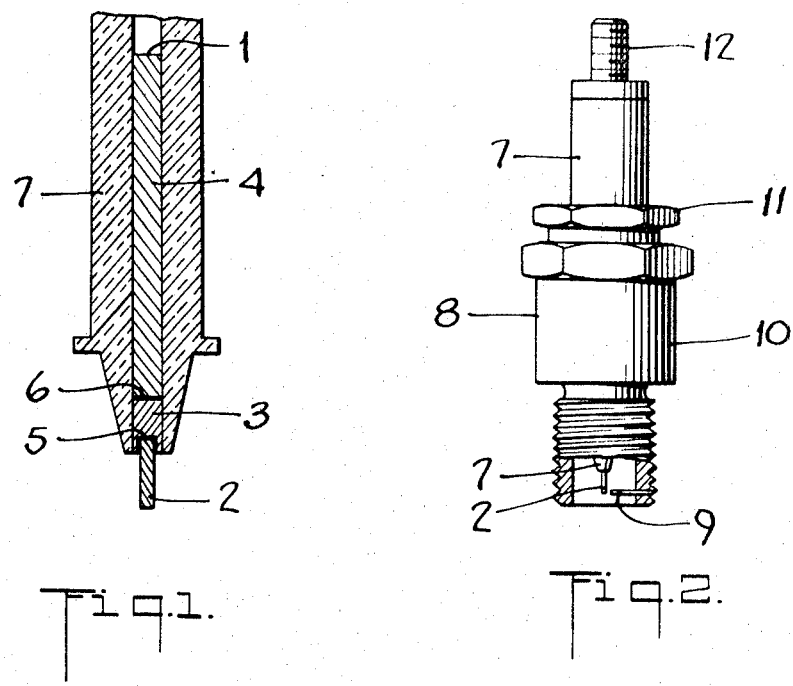

The present invention relates to compound articles of precious metals and to processes for making metal-to-metal bonds for compound metal articles and, more particularly, to metallurgically bonded articles comprising iridium or ruthenium.

The high melting point and corrosion resistance of iridium and ruthenium and certain alloys thereof make these metals highly useful as sparking tips in spark plugs and the heat- and electrical-conductivity properties of silver readily suggest the use of this metal as a lead-in conductor to a sparking tip made of the high melting metal or alloy. However, difficulties have been encountered in securing a satisfactory junction between silver and the high melting metal or alloy because the metallurgical characteristics of components made from the respective metals are so dissimilar. Thus, in view of the great difference between the melting points of silver and iridium it is not usually practical to weld these two metals together. For making such compound electrodes, it is known to dip the tip of iridium into a bath of molten silver so that the tip picks up a silver coating, to then apply a globule of liquid silver to the silver-coated tip and to then weld a silver rod to the solidified silver globule. However, electrodes made with such junctions have been unsatisfactory inasmuch as silver does not readily wet iridium and in consequence a strong continuous bond between the silver and iridium has not resulted. With prior electrodes having silver-iridium bonds the iridium tip often fell off the electrode and if it did not fall off there was such a poor metallurgical bond that internal sparking would often occur owing to the poor electrical contact between the iridium and the silver which resulted in undue heating and destruction of the junction.

Ruthenium and some ruthenium-rich or iridium-rich alloys also have very good heat resistance and corrosion resistance but do not bond well to silver. Thus, for heat resistant or corrosion resistant uses there also are needs for improved compound articles wherein silver and ruthenium or a ruthenium-rich alloy or an iridium-rich alloy are joined so as to have good strength, thermal conductivity and/or electrical conductivity across the junction connecting the silver and the other metal.

Although many attempts were made to overcome the foregoing difficulties and other difficulties and disadvantages, none, as far as I am aware, was entirely successful when carried into practice commercially on an industrial scale.

An improved means for joining silver to a high melting point metal such as iridium or ruthenium and an improved compound electrode including components made of these metals has now been discovered.

It is an object of the present invention to provide a new compound precious metal article.

Another object of the invention is to provide a new spark plug electrode, such as used in spark plugs for internal combustion engines.

A further object of the invention is to provide a new process for making metallurgical bonds between silver and iridium, iridium-rich alloys, ruthenium or ruthenium-rich alloys.

Other objects or advantages of the invention will become apparent from the following description taken in conjunction with the accompanying drawing in which:

FIGURE 1 illustrates a longitudinal section view of a compound metal electrode, which is an embodiment of the compound precious metal article of the invention, fitted in a spark plug insulator; and FIGURE 2 depicts a part section view of a spark plug comprising the electrode (in reduced scale) illustrated in FIGURE 1.

Generally speaking, the present invention contemplates a spark plug electrode or other compound metal article comprising a silver component, a high melting point component of a metal from the group consisting of iridium, ruthenium, alloys consisting essentially or iridium and 0.1% to 0.5% titanium-plus-zirconium, i.e., 0.1% to 0.5% titanium and/or zirconium, and alloys consisting essentially of ruthenium and 0.1% to 25% rhenium and having a silver-palladium alloy junction which is welded to the silver component and is brazed to the high melting point component. Ruthenium and the aforestated ruthenium-rhenium and iridium-titanium and/or zirconium alloy are all suited for use as the tips of electrodes of sparking plugs, being resistant to the erosive action of the spark. The silver-palladium alloy of the junction in the compound article of the invention is silver alloyed with about 1% to about 30% palladium. Advantageously, the junction is made of an alloy containing about 5% palladium and the balance essentially silver. Characteristics of the compound article of the invention provide good mechanical attachment of the high melting point components and good electrical and thermal conductivity between the silver component and the high melting point component.

For the purpose of giving those skilled in the art a better understanding of the invention, a sectional view of an illustrative example of a compound precious metal electrode in accordance with the invention is depicted in FIG. 1 of the attached drawing. Thus, FIG. 1 shows compound electrode 1 which comprises iridium tip 2, silver-palladium alloy junction 3 and silver conductor rod 4. The silver-palladium junction is made of an alloy containing 5% palladium and the balance essentially silver. The iridium and the silver of the tip and the conductor, respectively, are commercially pure metals. Brazed bond 5 joins the iridium tip to the silver-palladium junction and weld bond 6 joins the silver-palladium junction to the silver conductor. These two metallurgical bonds 5 and 6 provide good electrical and thermal conductivity through the compound electrode and bond 5 also provides strength for holding the tip. For use as an inner electrode in a spark plug, electrode 1 is fitted in ceramic insulator 7. The electrode is circular in transverse section and the insulator is annular in transverse section. Junction component 3 has been formed so as to mate with the interior of the hot-end portion of the insulator.

FIG. 2 shows iridium tip 2 extending from insulator 7 in spark plug 8, which also comprises outer electrode 9, threaded body 10, nut 11 and contact attachment stub 12. Within the insulator, the contact stub is electrically conductively connected to the silver conductor.

Another example of the invention is an electrode as described in connection with FIG. 1 and wherein the tip is an iridium-rich alloy containing 0.1% to 0.5% titanium-plus-zirconium, e.g., an alloy containing 0.3% titanium and the balance essentially iridium, instead of being commercially pure iridium.

The new compound article referred to herein can be made very satisfactorily by a new joining process which is also provided by the invention. In the new process, a high melting point metal component of a solid metal from the group consisting of iridium, ruthenium, alloys consisting essentially of iridium with 0.1% to 0.5% titanium plus zirconium, and alloys consisting essentially of ruthenium with 0.1% to 25% rhenium is wetted with a molten alloy of about 1% to about 30% palladium, advantageously about 5% palladium and balance essentially silver, to form a coating of said silver-palladium alloy on the solid component and a silver component is welded to the silver-palladium alloy. The welding together of the silver-palladium alloy and the silver component can be effected by known methods for satisfactorily welding silver. Advantageously, in order to insure welds which are free from porosity and thus exhibit a high heat conductivity, the welding is effected in an inert atmosphere.

In an illustrative example of the new joining process a molten globule of an alloy containing about 5% palladium and the balance essentially silver is applied to an iridium sparking tip for a spark plug electrode and is allowed to solidify on the tip, thus making a brazed bond with the tip. The solidified globule is press-formed to shape for fitting in a recess in a spark plug insulator. One end of a silver conductor rod is then welded in an inert atmosphere to the shaped silver-palladium alloy.

In another example, a ruthenium electrode tip is coated with a molten silver-palladium alloy and a silver conductor is welded to the silver-palladium alloy.

The present invention is particularly applicable in the production of sparking electrodes for spark plugs to be used in internal combustion engines. The invention is also more generally applicable in providing compound metal articles for use where there is needed an article having a heat resistant and/or corrosion resistant component securely bonded to another component having high electrical and/or thermal conductivity.

Ruthenium-rhenium alloy components in articles made in accordance with the invention can be of alloys containing 0.1% to 25% rhenium, advantageously 0.25% to 2.5% rhenium, e.g., 2.0% rhenium, and the balance essentially ruthenium which are described in United Kingdom Patent No. 1,032,005.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. A compound precious metal article comprising a high melting point component of a metal selected from the group consisting of iridium, ruthenium, iridium-rich alloys consisting essentially of 0.1% to 0.5% metal from the group consisting of titanium and zirconium with the balance essentially iridium and ruthenium-rich alloys consisting essentially of 0.1% to 25% rhenium with the balance essentially ruthenium joined with a braze bond to a silver-palladium alloy junction, the silver-palladium alloy of said junction consisting essentially of about 1% to about 30% palladium with the balance essentially silver, and a silver metal component joined by a weld bond to said silver-palladium alloy junction.

2. A compound metal article as set forth in claim 1 wherein the high melting point component is iridium metal.

3. A compound metal article as set forth in claim 1 wherein the high melting point component is ruthenium metal.

4. A compound metal article as set forth in claim 1 wherein the high melting point component is an alloy consisting of 0.1% to 0.5% metal selected from the group consisting essentially of titanium and zirconium with the balance essentially iridium.

5. A compound metal article as set forth in claim 1 wherein the high melting point component is an alloy consisting of 0.1% to 25% rhenium with the balance essentially ruthenium.

6. A compound metal article as set forth in claim 1 wherein the silver-palladium alloy of the junction consists of about 5% palladium with the balance essentially silver.

References Cited
UNITED STATES PATENTS

| | | | |
|---|---|---|---|
| 2,897,584 | 8/1959 | Schumpelt | 29—199 X |
| 3,217,404 | 11/1965 | Rhys | 29—199 X |
| 3,332,806 | 7/1967 | Teller | 29—199 |

HYLAND BIZOT, Primary Examiner

U.S. Cl. X.R.

23—169; 29—194, 492